United States Patent
Sonius

[15] 3,673,456
[45] June 27, 1972

[54] HEADLIGHTS WITH SAFETY RELAY CONTROL

[72] Inventor: Wesley Allan Sonius, 315 E. Cedar, Pocatello, Idaho 83201

[22] Filed: Jan. 29, 1970

[21] Appl. No.: 6,811

[52] U.S. Cl. .............................................. 315/83
[51] Int. Cl. ........................................ B60q 1/04, B60q 9/00
[58] Field of Search ........................................ 315/65, 82, 83

[56] References Cited

UNITED STATES PATENTS

| | | | |
|---|---|---|---|
| 3,369,147 | 2/1968 | Ramsey | 315/83 |
| 3,388,289 | 6/1968 | Zakus | 315/83 |
| 3,479,557 | 11/1969 | Schultz | 315/83 |

Primary Examiner—Ronald L. Wibert
Assistant Examiner—R. J. Webster
Attorney—Clarence A. O'Brien and Harvey B. Jacobson

[57] ABSTRACT

A dual winding relay is connected between the voltage source and headlights of a vehicle. When circuit continuity through the headlight low beam filaments is present, both windings on the relay conduct and cause full energization and switch-over of the relay contacts to a first state completing a current path through the low beam filaments. In the event a low beam filament is burned out, only one of the windings will become energized. Under these circumstances, the relay maintains a second state whereby the relay contacts connect the voltage source with a standby low beam filament.

6 Claims, 2 Drawing Figures

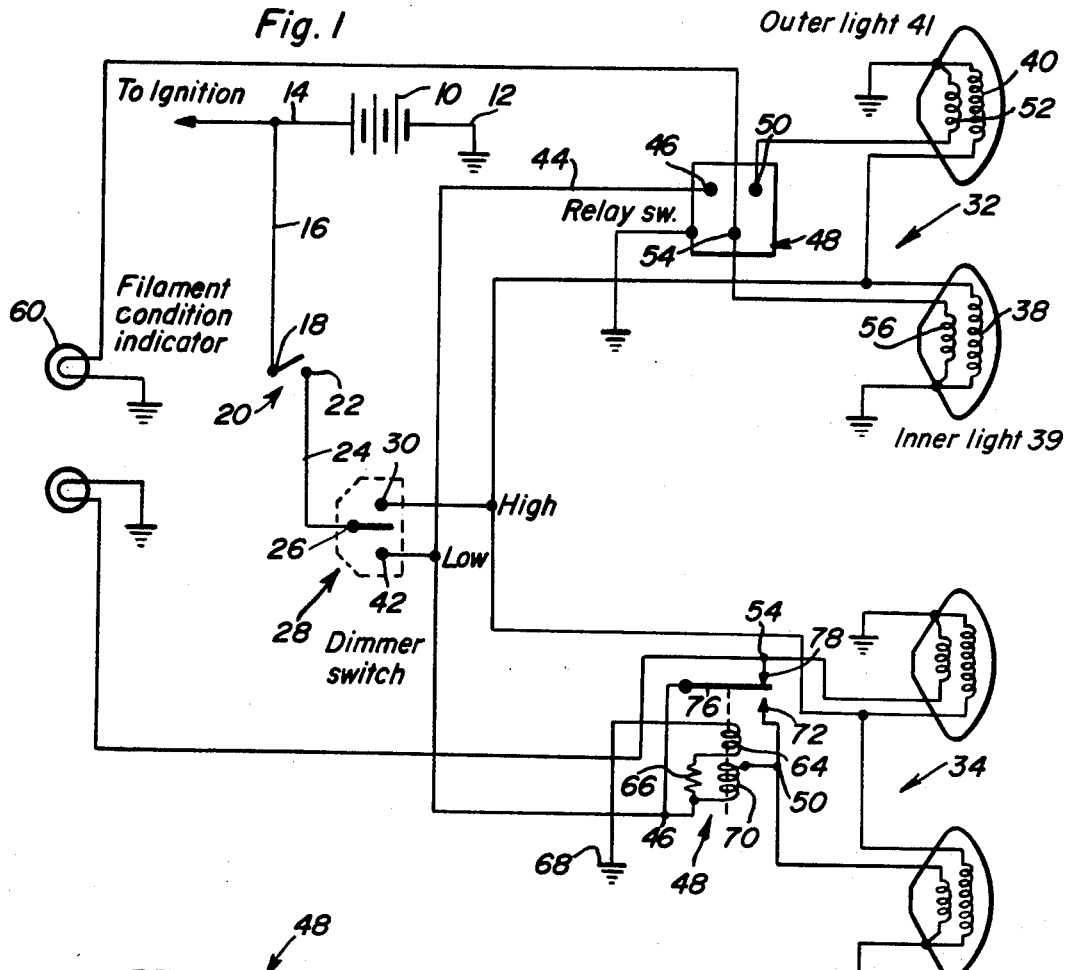
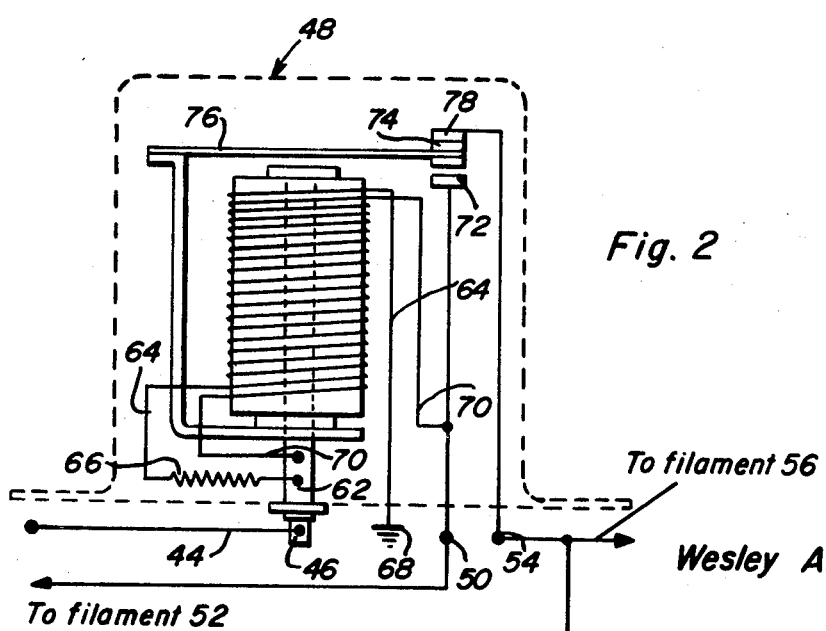

HEADLIGHTS WITH SAFETY RELAY CONTROL

At the present time, conventional vehicles are equipped with headlamps for generating low and high beams. In the event a low beam filament becomes burned out, only one remaining low beam filament will be lit. This condition prevents the driver from fully lighting the road in front of him and further induces confusion for an oncoming driver who will find it difficult to determine the relative position of the automobile with the burned out headlamp. This situation has been the cause of serious accidents, and in several jurisdictions a motorist driving with only one automobile headlight is subject to penalty.

In order to prevent the aforementioned occurrence, the present invention includes the design of a headlight control system which automatically energizes a standby low beam filament when the primary filament has been burned out. The present invention is simple in construction and inexpensive in fabrication so that it affords auto manufacturers an opportunity to eradicate a previously dangerous situation, at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an electrical schematic diagram of the circuit contained in the present invention.

FIG. 2 is a schematic diagram of the relay device which controls the system of the present invention.

Referring to the figures and more particularly FIG. 1, battery 10 indicates the voltage source in a conventional automobile having a positive terminal thereof connected to the ignition and accessories of the vehicle. The negative terminal is conventionally grounded to the chassis as indicated by 12. A connecting lead 16 is connected at one end thereof in parallel with lead 14. The opposite end of lead 16 terminates at a contact 18 of a single pole double throw headlight selector switch 20. The other contact 22 of the switch 20 is connected to the selector contact 26 of a dimmer switch 28 through an interconnecting lead 24. In the usual manner, after closing of selector switch 20, the dimmer switch 28 governs whether the low or high beams of headlight assemblies 32 and 34 are to be lit.

A first fixed contact 30 represents the high beam output of the dimmer switch 28 and is connected in parallel to the high beam filaments 38 and 40 of the inner and outer headlights 39 and 41, respectively. For purposes of convenience, only one headlight assembly 32 will be discussed in detail. However, as will be appreciated, the headlight assembly 34 generally located at the opposite side of the vehicle includes the identical circuit components connected in parallel with the dimmer switch 28. A second stationary contact 42 provides a low beam output from dimmer switch 28. This output is connected to the first input terminal 46 of a relay switch 48 through an interconnecting lead 44. A first output terminal 50 of the relay switch 48 is connected to ground through a low beam filament 52 in the outer light 41 constituting a primary load for the low beam circuits.

At this point, it should be noted that the relay switch 48 is connected in the low beam circuit and in no way affects the usual operation of the high beam circuits. The present device has been so designed because the low beams of most vehicles are burned more frequently and for longer periods of time than the high beams. As a result, most lamp failures occur in the low beam filaments. However, as will be appreciated, the principle of the present invention may be applied to high beam filaments if additional filaments of this type were provided for standby use. Further, the standby filament 56 is located in headlight 39 separate from the headlight 41 within which the filament 52 is located so as to reduce the likelihood of both filaments becoming ruptured as a result of damage to the entire headlight 41.

As will be noted from FIG. 1, the headlight assembly 32 resembles the conventional dual headlight assemblies of vehicles with the exception of an additional filament 56 which has been placed in the inner light 39 so that it may be switched in if failure of the low beam filament 52 occurs. The standby filament 56 is connected to a second output terminal 54 and as will be explained hereinafter, upon failure of filament 52, the input terminal 46 of relay switch 48 is switched from output terminal 50 to output terminal 54 whereby the standby low beam filament 56 becomes lit. A filament condition indicator 60 is connected between the second output terminal 54 and ground so that the indicator is lit when the standby filament 56 becomes energized. Preferably, the indicator 60 is mounted on the dashboard of the vehicle to alert the driver that automatic switching from a burned out filament has occurred thereby allowing the driver to have the burned out lamp replaced at his earliest convenience.

FIG. 2 diagrammatically illustrates the relay switch 48 which is seen to include a binding post 62 for connecting lead 44 to the input terminal 46 shown in FIG. 1. The relay switch 48 includes an operating winding 64 designated as a hold-in winding which is connected to the binding post 62 through a load resistor 66. The opposite end of the winding is grounded (68). A second concentrically wound pull-in winding 70 has a first end thereof connected to the binding post 62 while the opposite end of this winding is connected to the output terminal 50 which in turn is directly connected to the low beam filament of the outer light 41 as seen in FIG. 1. Thus, the winding 70 senses the operative condition of the filament 52. A first fixed contact 72 is connected in parallel with the output terminal 50 and is adapted to be engaged by a movable contact 74 attached to relay arm 76. The relay arm is electrically connected to the binding post 62 so when filament 52 is in good order, energizing current will flow through both windings 64 and 70. Momentarily, energization of both windings causes the arm 76 to flip downwardly thereby effecting the completion of a circuit between binding post 62, arm 76, contact 74, contact 72, output terminal 50, and low beam filament 52. When the contact 74 closes against contact 72 current ceases to flow through the pull-in winding 70 because current flows in the path of least resistance, that is 76 to 74 to 72 (minimal resistance), instead of through the pull-in winding 70. This action stops the flow through winding 70. Then only the hold-in winding 64 will keep the contact arm 76 with contact 74 against contact 72 until the current flow to the relay is stopped by switching the dimmer switch 28 to high beam.

In the event filament 52 burns out, circuit continuity between winding 70 and filament 52 is disrupted thereby preventing the flow of current in this winding. Inasmuch as hold-in filament 64 is fixed to ground, current will flow through this winding. However, the current flowing through the hold-in winding 64 is insufficient to flip the contact 74 from its normal biased engagement with contact 78 which in turn is connected to the output terminal 54. This output terminal provides energizing current to the standby low beam filament 56 of the inner light 39. Otherwise stated, in the event of discontinuity or burn-out of filament 52 the current flowing only in the hold-in winding 64 is insufficient to exceed a certain threshold value required to energize the relay to a contact flipping condition.

Thus, in operation of the present invention, when the low filament beam 52 of the outer light 41 no longer functions properly, the relay switch 48 automatically completes an energizing circuit through the standby low beam filament 56 of the inner light 39.

As an option to the circuitry described hereinbefore, the aforementioned filament condition indicator 60 connected in parallel with the output terminal 54 of relay switch 48 alerts the driver that the standby low beam filament has been pressed into service. After replacing the burn-out low beam filament in the outer light 41, the relay will operate as previously described in connection with normal low beam operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A lighting circuit for use with a vehicle current source and a headlight system having a normal low beam filament, an emergency low beam filament, and at least one high beam filament, said circuit comprising a first primary circuit path connected to said high beam filament, a second primary circuit path normally connected to said normal low beam filament, switch means for selective connection of either of said primary circuit paths with the current source, relay means including a relay switch in said second primary circuit path and an associated actuation solenoid with first and second coils in magnetic adding polarity, said first coil being connected to said primary circuit path in series with said normal low beam filament to form a first branch circuit, said second coil being connected in a second branch circuit in parallel with said first branch circuit, said relay switch when in a first position connecting said emergency low beam filament to said second primary circuit path and in parallel with said second branch circuit, current flow through both of said first and second coils being effective to actuate said relay switch to a second position to disconnect said emergency low beam filament from said second primary circuit path, shunt said first coil, and connect said normal low beam filament in parallel with said second branch circuit, current flow through either coil alone being effective to hold said relay switch in said second position but ineffective to actuate said relay switch from said first position to said second position.

2. The structure set forth in claim 1 wherein said first and second coils are magnetically coupled with a common magnetic core associated with said relay means.

3. The structure set forth in claim 2 wherein said second branch circuit includes resistance means in series with said second coil.

4. The structure set forth in claim 3 wherein said relay switch includes a single pole, double throw movable contact.

5. A lighting circuit for use with a vehicle having a current source and a headlight system having a normal low beam filament, an emergency low beam filament, and at least one high beam filament, said circuit comprising a first primary circuit path connected to said high beam filament, a second primary circuit path for connection with one of said low beam filaments, switch means selectively movable between high beam and low beam positions to connect either said first primary circuit path or said second primary circuit path to said current source, relay means including a hold-in coil and a pull-in coil, said pull-in coil being in said second primary circuit path and being in series with said normal low beam filament, said relay means being operable when in a first mode to connect said normal low beam filament directly to said current source when said switch means is in low beam position and when in a second mode to connect said emergency low beam filament to said current source in response to movement of said switch means to said low beam position from said high beam position subsequent to open circuiting of said normal low beam filament, said hold-in coil alone being ineffective to operate said relay means from said second mode to said first mode.

6. The structure set forth in claim 5 wherein said pull-in coil is shunted when said relay means is in said first mode to connect said normal low beam filament directly to said current source.

* * * * *